(12) United States Patent
Lee et al.

(10) Patent No.: US 10,459,149 B2
(45) Date of Patent: Oct. 29, 2019

(54) BACKLIGHT UNIT AND DISPLAY DEVICE INCLUDING THE SAME

(71) Applicant: Samsung Display Co. Ltd., Yongin-si (KR)

(72) Inventors: Hye Sog Lee, Osan-si (KR); Byung Choon Yang, Seoul (KR); Jae Ho You, Gwangmyeong-si (KR)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 0 days.

(21) Appl. No.: 15/984,069

(22) Filed: May 18, 2018

(65) Prior Publication Data

US 2019/0011628 A1 Jan. 10, 2019

(30) Foreign Application Priority Data

Jul. 10, 2017 (KR) .................. 10-2017-0087330

(51) Int. Cl.
*G02B 6/10* (2006.01)
*F21V 8/00* (2006.01)

(52) U.S. Cl.
CPC ......... *G02B 6/0035* (2013.01); *G02B 6/0025* (2013.01); *G02B 6/0036* (2013.01); *G02B 6/0091* (2013.01); *G02B 6/0038* (2013.01); *G02B 6/0055* (2013.01); *G02B 6/0073* (2013.01)

(58) Field of Classification Search
CPC .................................................. G02B 6/0036
USPC ....................................................... 362/97.1
See application file for complete search history.

(56) References Cited

U.S. PATENT DOCUMENTS

| | | | | |
|---|---|---|---|---|
| 5,897,201 A | * | 4/1999 | Simon | F21V 5/00 362/147 |
| 7,178,946 B2 | * | 2/2007 | Saccomanno | G02B 6/0096 362/147 |
| 7,422,357 B1 | * | 9/2008 | Chang | G02B 6/0038 362/602 |
| 2004/0047162 A1 | * | 3/2004 | Saccomanno | G02B 6/0096 362/558 |
| 2008/0123350 A1 | * | 5/2008 | Choe | G02B 6/0016 362/331 |

(Continued)

FOREIGN PATENT DOCUMENTS

| | | |
|---|---|---|
| EP | 1084366 | 9/2003 |
| EP | 1567803 | 12/2007 |
| JP | 4881321 | 2/2012 |

(Continued)

OTHER PUBLICATIONS

European Search Report—European Application No. 18177910.9 dated Nov. 12, 2018, citing references listed within.

(Continued)

*Primary Examiner* — Christopher M Raabe
(74) *Attorney, Agent, or Firm* — Cantor Colburn LLP

(57) ABSTRACT

A backlight unit includes: a light source unit including a point light source; and a light guide plate disposed on a path of light emitted from the light source unit, where a plurality of split patterns is defined in the light guide plate. The plurality of split patterns transmits a part of the light emitted from the light source unit and reflects a remaining part thereof, and the plurality of split patterns is concentrically arranged on the light guide plate and around the light source unit.

20 Claims, 16 Drawing Sheets

(56) References Cited

U.S. PATENT DOCUMENTS

2015/0219913 A1    8/2015  Lee et al.

FOREIGN PATENT DOCUMENTS

| KR | 1020140067736 | 6/2014 |
| KR | 1020150079800 | 7/2016 |
| KR | 1020170037899 | 4/2017 |

OTHER PUBLICATIONS

Wei Hu et al., "Flat panel coherent backlight for holographic displays with improved diffraction efficiency", SID, (2015), pp. 530-533.

* cited by examiner

BACKLIGHT UNIT AND DISPLAY DEVICE INCLUDING THE SAME

This application claims priority to Korean Patent Application No. 10-2017-0087330, filed on Jul. 10, 2017, and all the benefits accruing therefrom under 35 U.S.C. 119, the content of which in its entirety is herein incorporated by reference.

BACKGROUND

1. Field

The invention relates to a backlight unit and a display device including the backlight unit.

2. Description of the Related Art

The importance of a display device has increased with the development of multimedia. Accordingly, various types of display devices, such as a liquid crystal display ("LCD") and an organic light-emitting display ("OLED"), have been widely used in various electrical devices.

A display device may be classified into a three-dimensional stereoscopic image display device and a two-dimensional image display device. The three-dimensional stereoscopic image display device is different from the two-dimensional image display device in that the three-dimensional stereoscopic image display device provides an observer with actual image information, or image information and depth information. Methods for reproducing a three-dimensional stereoscopic image may include stereoscopy, holography, and integral imaging. Here, in the holography method, when observing a holography produced by using a laser as a light source, an observer may view or feel a stereoscopic image as a real object without wearing special eyeglasses. Accordingly, the holography method is known as a method in high stereoscopic effects and capable of allowing an observer to feel a stereoscopic image without fatigue.

The holography method uses a principle of recording and reproducing interference signals obtained by superimposing light (object wave) reflected from an object and light (reference wave) having coherence. A technology of recording interference patterns on a film, the interference patterns being formed by bringing object waves scattered by collision with an object using laser light having high coherence into contact with reference waves incident from another direction, is referred to as hologram. Here, when object waves and reference waves meet each other, interference patterns are formed by interference. In this case, a technology of restoring the information recorded in the hologram into a three-dimensional image by irradiating such interference patterns with reference light is referred to as holography.

SUMMARY

An embodiment of the invention relates to a backlight unit for converting a point light source into a surface light source instantly, and a display device including the backlight unit.

Another embodiment of the invention relates to a backlight unit for generating a surface light source in a state in which the coherence of light is maintained, and a display device including the backlight unit.

Still another embodiment of the invention relates to a backlight having thin thickness with improved light efficiency, and a display device including the backlight unit.

According to an exemplary embodiment of the invention, a backlight unit includes: a light source unit including a point light source; and a light guide plate disposed on a path of light emitted from the light source unit, where a plurality of split patterns is defined in the light guide plate. In such an embodiment, the plurality of split patterns transmits a part of the light emitted from the light source unit and reflects a remaining part thereof, and the plurality of split patterns is concentrically arranged on the light guide plate and around the light source unit.

According to an exemplary embodiment of the invention, a display device includes: a display panel; a backlight unit which provides light to the display panel, where the backlight unit includes a light source unit, and a light guide plate disposed on a path of light emitted from the light source unit. In such an embodiment, the light guide plate includes a plurality of split patterns which transmits a part of the light emitted from the light source unit and reflects a remaining part thereof, and the plurality of split patterns is concentrically arranged on the light guide plate and around the light source unit.

BRIEF DESCRIPTION OF THE DRAWINGS

The above and other features of the invention will become more apparent by describing in detail exemplary embodiments thereof with reference to the attached drawings, in which.

DETAILED DESCRIPTION

Figure 1:
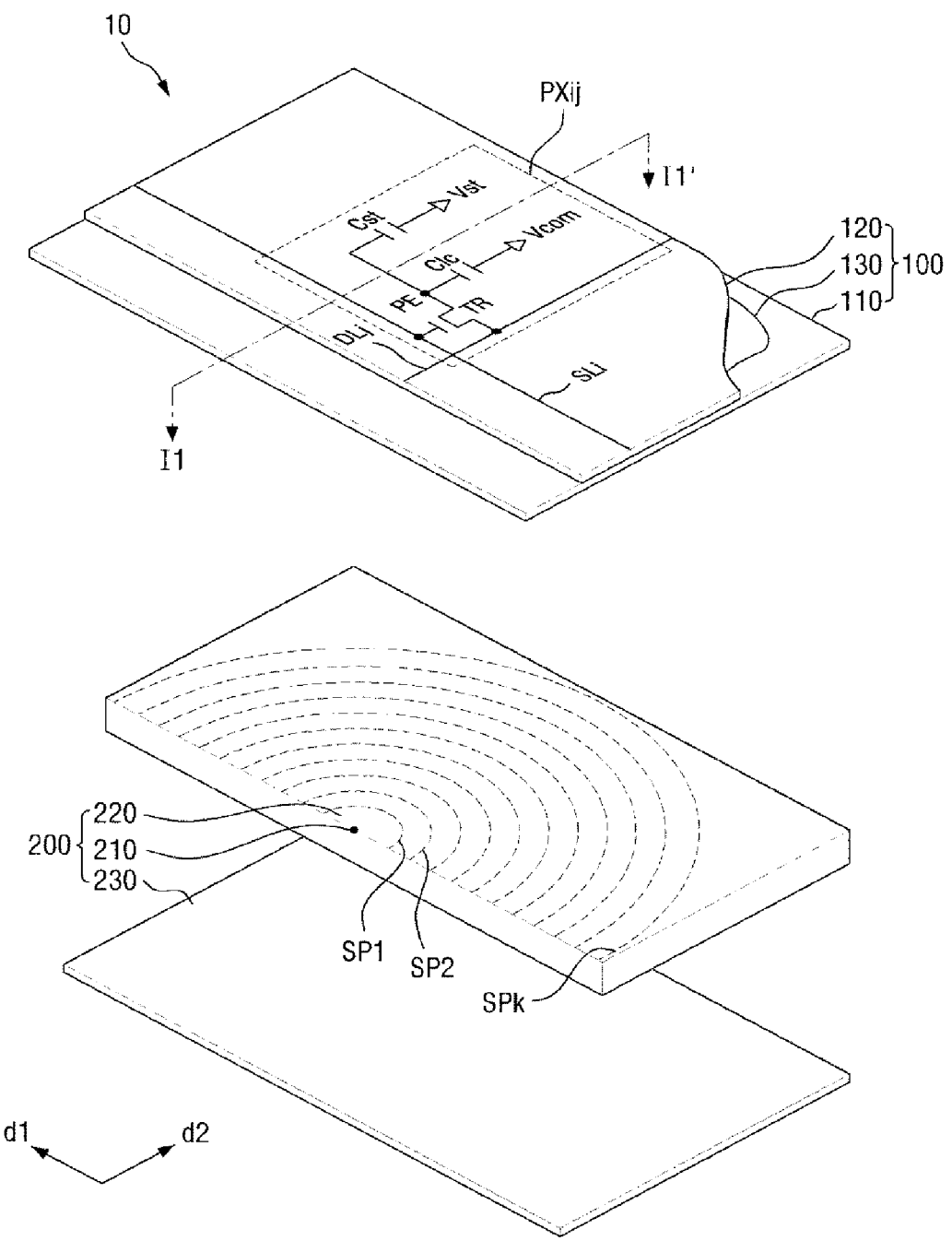
FIG. 1 is a schematic exploded perspective view of a display device according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof "Or" means "and/or." As used herein, the term "and/or" includes any and all combinations of one or more of the associated listed items.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, exemplary embodiments of the invention will be described with reference to the accompanying drawings.

FIG. 1 is a schematic exploded perspective view of a display device according to an embodiment of the invention.

Referring to FIG. 1, an embodiment of a display device 10 may include a display panel 100 and a backlight unit 200. Although not shown in the drawings, the display device 10 may further include other conventional elements typically included in a display device, a window member, a rear case, a front case, and the like, for example. Herein, for convenience of description, any detailed description of such conventional elements will be omitted, and the display panel 100 and the backlight unit 200 will be mainly described.

The display panel 100 is a panel for displaying an image. The display panel 100 may display an image using light received from the backlight unit 200. In an embodiment, the display panel 100 may display a three-dimensional stereoscopic image.

In an embodiment, the display panel 100 may be a liquid crystal display panel. In such an embodiment, the display panel 100 may include a first substrate 110, a second substrate 120, and a liquid crystal layer 130. The first substrate 110 and the second substrate 120 may be disposed opposite to, or to face, each other. The liquid crystal layer is interposed between the first substrate 110 and the second substrate 120.

In an embodiment, the first substrate 110 may be a transparent insulation substrate. In such an embodiment, the transparent insulation substrate may include a glass substrate, a quartz substrate, or a transparent resin substrate. A plurality of scan lines including a i-th scan line SLi (i is a natural number of 1 or greater), a plurality of data lines including a j-th data line DLj (j is a natural number of 1 or greater), and a plurality of pixels including a pixel connected to the i-th scan line SLi and the j-th data line DLj (hereinafter, (i,j) pixel PXij) may be arranged on the first substrate 110. For convenience of illustration, in FIG. 1, the i-th scan line SLi, the j-th data line DLj, and the (i,j) pixel PXij are shown with solid lines.

The i-th scan line SLi may extend in a first direction d1. The j-th data line DLj may extend in second direction d2 different from the first direction d1. In such an embodiment, the i-th scan line SLi and the j-th data line DLj are insulated from each other. In such an embodiment, the first direction d1 and the second direction d2 may intersect each other.

The (i,j) pixel PXij may include a switching element TR, a pixel electrode PE, a liquid crystal capacitor Clc, and a storage capacitor Cst.

In an embodiment, the switching element TR may be a three-terminal element such as a thin film transistor. In the switching element TR, a control electrode may be electrically connected with the i-th scan line SLi, and one electrode may be electrically connected with the j-th data line DLj. The other electrode of the switching element TR may be electrically connected with a pixel electrode PE.

The switching element TR may be turned on in response to the scan signal received from the i-th scan line SLi to provide the data signal received from the j-th data line DLj to the pixel electrode PE. In an embodiment, the (i,j) pixel PXij may include a single switching element, but the invention is not limited thereto. Alternatively, the (i,j) pixel Pxij may include two or more switching elements.

The liquid crystal capacitor Clc may be defined or formed between the pixel electrode PE and a common electrode which receives a common voltage Vcom.

Although not shown in the drawings, in an embodiment, the common electrode may be disposed on the second substrate 120 to overlap the pixel electrode PE. Here, the term "overlapping" refers to a disposition relationship to such a degree that capacitance coupling occurs between two electrodes as the two electrodes are disposed adjacent to each other.

In an embodiment, the storage capacitor Cst may be defined or formed between the pixel electrode PE and a storage line which receives a storage voltage Vst. Alternatively, the storage capacitor Cst may be omitted.

The second substrate 120 may be disposed to face the first substrate 110. The second substrate may include or be made of transparent glass or plastic. In an embodiment, the second substrate 120 may include or be made of a same material as the first substrate 110. In an embodiment, a plurality of color filters (for example, red, green and blue color filters) and a black matrix may further be disposed on the second substrate 120, in addition to the aforementioned common electrode.

The liquid crystal layer 130 includes a plurality of liquid crystal molecules. In an embodiment, the plurality of liquid crystal molecules may have negative dielectric anisotropy. In such an embodiment, the plurality of liquid crystal molecules may be arranged in a direction perpendicular to the first substrate 110 when an electric filed is not generated in the liquid crystal layer 130. In such an embodiment, the plurality of liquid crystal molecules may change the polarization of light provided to the liquid crystal layer 130 by rotating or tilting in a specific direction when an electric field is generated between the first substrate 110 and the second substrate 120.

In an embodiment, although not shown in the drawings, the display device 10 may further include a data driver for providing a data signal to the j-th data line DLj, a scan driver for providing a scan signal to the i-th scan line SLi, and a timing controller for controlling the operations of the scan drier and the data driver. The arrangement of each of the data driver, the scan driver, and the timing controller is not particularly limited.

Next, the backlight unit 200 will be described.

The backlight unit 200 may provide light having a wavelength of a specific region to the display panel 100. The backlight unit 200 may include a light source unit 210, a light guide plate 220, and a reflective sheet 230. For convenience of illustration, the light source unit 210 and the light guide plate 220 are briefly shown by dotted lines in FIG. 1.

The light source unit 210 includes a light source that emits light. In an embodiment, the light source is a point light source. Although not shown in FIG. 1, a light diffusion unit (240, refer to FIG. 2) for diffusing the light emitted from the light source unit 210 may be disposed between the light source unit 210 and the light guide plate 220. Such a configuration will be described later in greater detail with reference to FIG. 2.

The light guide plate 220 guides light traveling therein or changes the path of light provided thereto from the light source unit 210, and provides the light to the display panel 100. In an embodiment, the light guide plate 220 may include first to k-th split patterns SP1 to SPk (k is a natural number of 1 or greater). The first to k-th split patterns SP1 to SPk may be arranged concentrically on the plane with respect to the light source unit 210. Such a configuration will be described later in greater detail.

Figure 5:
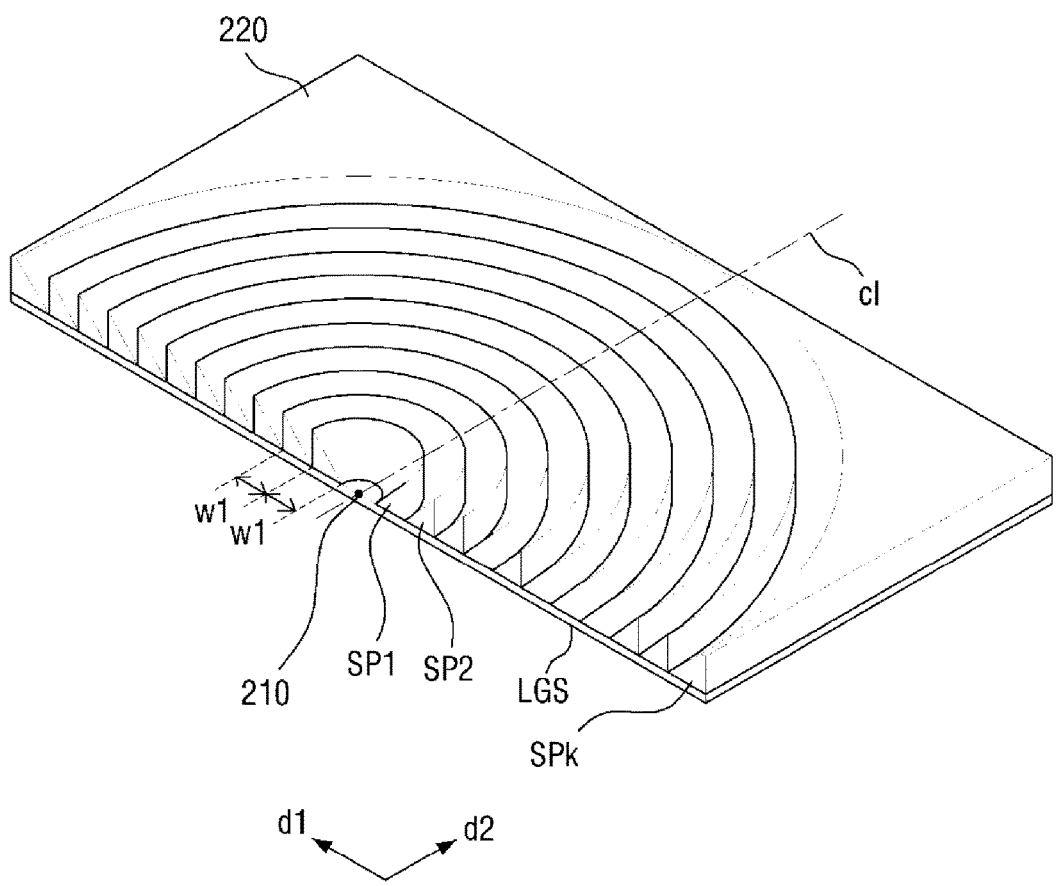
FIG. 5 is a perspective view showing the first to k-th split patterns shown in FIG. 2.

Herein, the light guide plate 220 means the entire configuration in which the first to k-th split patterns SP1 to SPk are arranged on a light guide substrate LGS (refer to FIG. 5). In an embodiment, the light guide plate 220 may include a transparent resin having a high refractive index such as acrylic resin, polycarbonate resin, or polymethyl methacrylate ("PMMA"). The shape and size of the light guide plate 220 is not limited to those shown in FIG. 1, and may be variously modified based on the shape of the display panel 100.

The light guide plate 220 may receive the light emitted from the light source unit 210, change the path of the light traveling therethrough, and then provide the light to the display panel 100. In such an embodiment, although the light source unit is a point light source as described above, the light provided to the display panel 100 corresponds to a surface light source due to the change of light path by the light guide plate 220. In such an embodiment, the backlight unit 200 may convert a point light source into a surface light source instantly, and provide the converted light to the display panel 100.

The light guide plate 220 may convert the path of the light emitted from the light source unit 210 in a substantially vertical direction to provide the light to the display panel 100. in an embodiment, the first to k-th split patterns SP1 to SPk may convert the path of a part of the light provided to the light guide plate 220 into a vertical direction to provide the light to the display panel 100. Such features will be described in greater detail with reference to FIGS. 2 and 3.

Referring back to FIG. 1, the reflective sheet 230 is disposed under the light guide plate 220. The reflective sheet 230 may reflect the light reflected from the light guide plate 220 back to the interior of the light guide plate 220. In an alternative embodiment, the reflective sheet 230 may be omitted.

Figure 2:
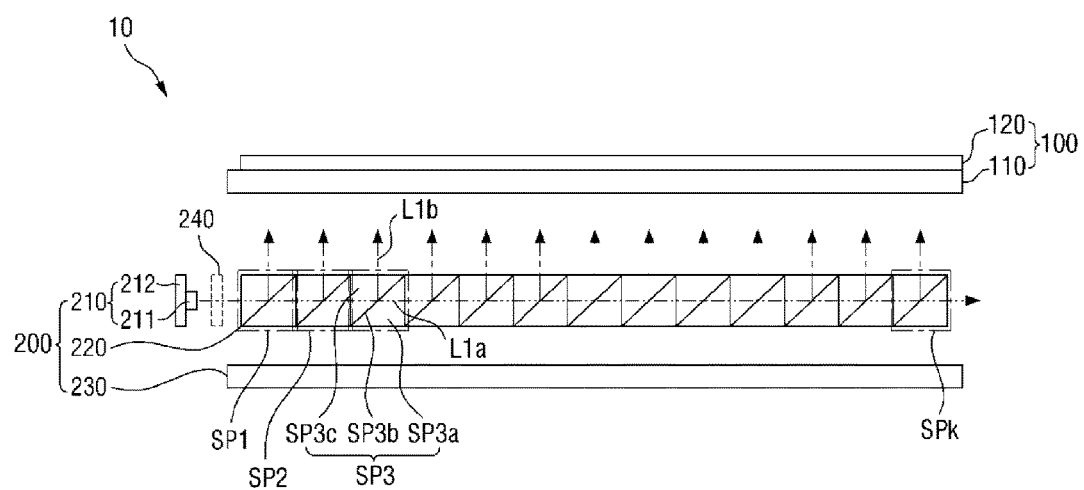
FIG. 2 is a sectional view taken along line I1-I1' of FIG. 1.
Figure 3:
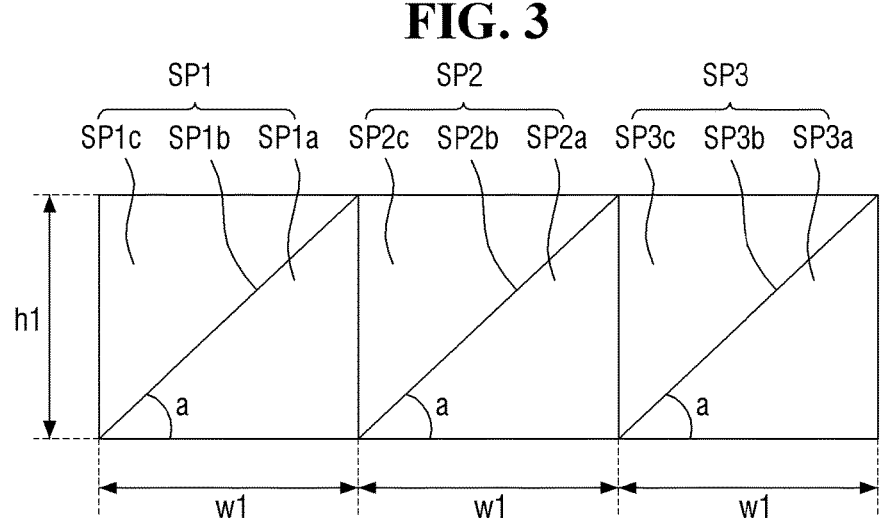
FIG. 3 is an enlarged view showing the first to third split patterns shown in FIG. 2.

FIG. 2 is a sectional view taken along line I1-I1' of FIG. 1. FIG. 3 is an enlarged view showing the first to third split patterns shown in FIG. 2. For convenience of illustration, in FIG. 2, some of the components shown in FIG. 1 (for example, the liquid crystal layer 130) are not shown.

Referring to FIGS. 2 and 3, an embodiment of the backlight unit 200 may include a light source unit 210, a light guide plate 220, a reflective sheet 230, and a light diffusion unit 240. Hereinafter, the components included in the backlight unit 200 will be described along the path of the light emitted from the light source unit 210.

The light source unit 210 may emit light to one lateral side of the light guide plate 220. In an embodiment, the light guide plate 220 includes one lateral side disposed at a position extending along the first direction d1 and the other lateral side extending along the first direction d1 and disposed opposite to the one lateral side in the second direction d2. Such lateral sides are defined as one lateral side and the other lateral side in the length direction (or the first direction d1) of the light guide plate 220. In one embodiment, for example, the light source unit 210 may be disposed at a center between the one lateral side and the other lateral side in the length direction of the light guide plate 220.

In such an embodiment, the light guide plate 220 includes one lateral side disposed at a position extending along the second direction d2, and the other lateral side disposed opposite thereto. Such lateral sides are defined as one lateral side and the other lateral side in the width direction (or the second direction d2) of the light guide plate 220. In an embodiment, as shown in FIG. 1, the light source unit 210 may be disposed at a center between one lateral side and the other lateral side in the width direction of the light guide plate 220.

In an embodiment, the light source unit 210 may include a light source 211 and a printed circuit board 212. The light source 211 emits light to the light guide plate 220. Here, the light source 211 means a point light source. Herein, the point light source is not defined by the number or kind of the light source, but defined by the relationship with the light guide plate 220. More specifically, when comparing the width of the light guide plate 220 with the width of the light emitted from the light source 211, if the width of the light emitted from the light source 211 is sufficiently smaller than the width of the light guide plate 220, the light source 211 may be defined as a point light source. In one embodiment, for example, even when the light source 211 includes a plurality of light emitting diodes ("LED"s), the width of the light emitted from the plurality of LEDs may be sufficiently smaller than the width of the light guide plate 220, such that the plurality of LEDs may be regarded as point light sources.

However, the kind of the light source 211 is not necessarily limited to the LED. In an alternative embodiment, the light source 211 may be a laser diode ("LD"), a laser, a lamp or the like, for example. Hereinafter, for convenience of description, embodiments where the display device 10 includes the light source unit 210 including a single LED as the light source 211 will be described in detail, but not being limited thereto.

The light source 211 may be disposed on the printed circuit board 212. The printed circuit board 212 includes a conductive pattern. The light source 211 receives an electrical signal through the conductive pattern, and may emit light to the light guide plate 220 based on the electrical signal. The shape of the printed circuit board 212 and the disposition structure of the light source 211 on the printed circuit board are not limited to those shown in FIG. 2.

Although not shown in the drawings, the light source unit 210 may further include a heat dissipation plate. The heat dissipation plate may be disposed under the printed circuit board 212 to dissipate the heat generated from the light source 211 or the printed circuit board 212 to an outside.

The light diffusion unit 240 may be disposed between the light source unit 210 and the light guide plate 220. The light diffusion unit 240 may convert the light emitted from the light source unit 210 into diffused light. In an embodiment, the light diffusion unit 240 may extend the proceeding width of the light incident from the light source unit 210 and transmit the light having extended proceeding width to the light guide plate 220. In an embodiment, the diffused light may have a hemispherical shape on a plane.

The kind of the light diffusion unit 240 is not particularly limited as long as the light emitted from the light source unit 210 is capable of be converted into diffused light. In one embodiment, for example, the light diffusion unit 240 may be a negative lens. In an embodiment, where the light diffusion unit is composed of a single lens, the negative lens may have a concave lens shape.

The light guide plate 220 changes the path of diffused light provided from the light diffusion unit 240, and provides the diffused light to the display panel 100. In an embodiment, the light guide plate 220 transmits a part of the diffused light and reflects the remaining part thereof. In such an embodiment, the light guide plate 220 may include first to k-th split patterns SP1 to SPk to be described later. Hereinafter, the transmitted light is denoted by L1a, and the reflected light is denoted by L1b.

In an embodiment, as described above, the first to k-th split patterns SP1 to SPk may be arranged concentrically with respect to the light source 211 on a plane (refer to FIG. 1). The first to k-th split patterns SP1 to SPk on a section will be described in greater detail with reference to FIG. 2.

In an embodiment, the first to k-th split patterns SP1 to SPk may not be spaced apart from each other. In such an embodiment, the first to k-th split patterns SP1 to SPk may be in direct contact with each other. Each of the first to k-th split patterns SP1 to SPk may include a light splitting portion, an incident surface, and a flat portion. Although not shown in the drawings, in an alternative embodiment, the first to k-th split patterns SP1 to SPk may include two adjacent split patterns spaced apart from each other by a predetermined distance.

Hereinafter, the third split pattern SP3 of the first to k-th split patterns SP1 to SPk will be described in detail.

The third split pattern SP3 may include a light splitting portion SP3a, an incident surface SP3b, and a flat portion SP3c. In an embodiment, the light splitting portion SP3a may have a triangular shape in the section. In an embodiment, the flat portion SP3c may be symmetrical with the light splitting portion SP3a based on the incident surface SP3b. In such an embodiment, the flat portion SP3c may have an inverted triangular shape in the section.

In an embodiment, the light splitting portion SP3a and the flat portion SP3c may be formed by a same process as each other. In such an embodiment, the light splitting portion SP3a and the flat portion SP3c may include or be formed of a same material as each other.

The incident surface SP3b is defined as a surface to which light is provided, or as a surface dividing the light splitting portion SP3a and the flat portion SP3c. Therefore, the light splitting portion SP3a and the flat portion SP3c may share the incident surface SP3b. In an embodiment, the incident surface SP3b may be integrally formed with the light splitting portion SP3a.

A part of the light incident onto the incident surface SP3b travels through the incident surface SP3b, and a remaining part of the light is reflected by the incident surface SP3b to be provided to the display panel 100. The reflected light L1b may be reflected to be perpendicular to the transmitted light L1a, and may be provided to the display panel 100.

In an embodiment, a light splitting pattern SPi (i is a natural number greater than or equal to 1 and less than or equal to k) transmits a part of the light incident onto an incident surface SPib thereof, and reflects a remaining part of the light. In such an embodiment, the reflected light L1b may be emitted in a substantially vertical direction with respect to light provided on the incident surface SPib of the light splitting pattern SPi. In such an embodiment, since each of the first to k-th split patterns SP1 to SPk includes a flat portion along with a light splitting part, the flatness of the light guide plate 220 may be secured. In an alternative embodiment, each of the first to k-th split patterns SP1 to SPk may not include the flat portion SP3c.

The first to third split patterns SP1 to SP3 will be described in greater detail with reference to FIG. 3.

Referring to FIG. 3, in an embodiment, each of the first to k-th split patterns SP1 to SPk may have a same shape as each other. Thus, in such an embodiment, the thickness h1 of each of the first to third split patterns SP1 to SP3 and the width w1 thereof in the section may be equal to each other. In such an embodiment, the width w1 of each of the first to third split patterns SP1 to SP3 in the section may be equal to the thickness h1 thereof. Therefore, each of the first to third split patterns SP1 to SP3 may have a shape of an isosceles triangle having a base (a width w1 in FIG. 3) and a height (a thickness h1 in FIG. 3) equal to each other.

In such an embodiment, the angles a of the incident surfaces SP1b to SP3b of the first to third split patterns SP1 to SP3 with a bottom surface thereof may be the same as each other. The angle a of each of the incident surfaces SP1b to SP3b is not particularly limited as long as the light incident on the first to third split patterns SP1 to SP3 is allowed to be reflected in the vertical direction and to be provided to the display panel 100. In one embodiment, for example, the angle a of each of the incident surfaces SP1b to SP3b may be about 45°.

The width w1 and thickness h1 of each of the first to third split patterns SP1 to SP3 are the same as each other, and, for example, may be in a range of about 1 millimeter (mm) to about 3 mm. Such a configuration will be described in greater detail with reference to FIG. 4.

Figure 4A:
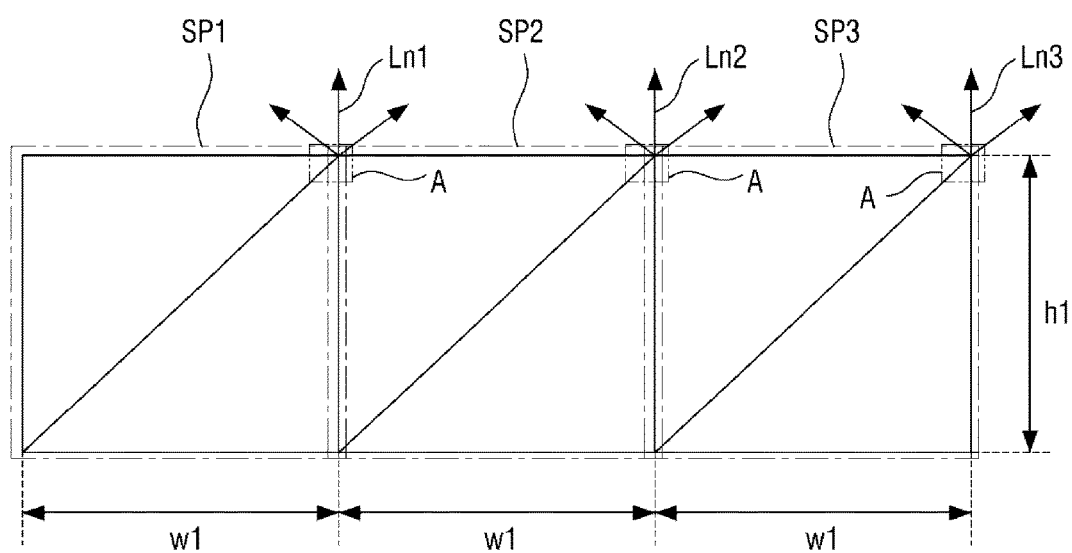
FIGS. 4A and 4B are cross-sectional views for explaining the scattered noises generated in the edge of the split pattern shown in FIG. 2.
Figure 4B:
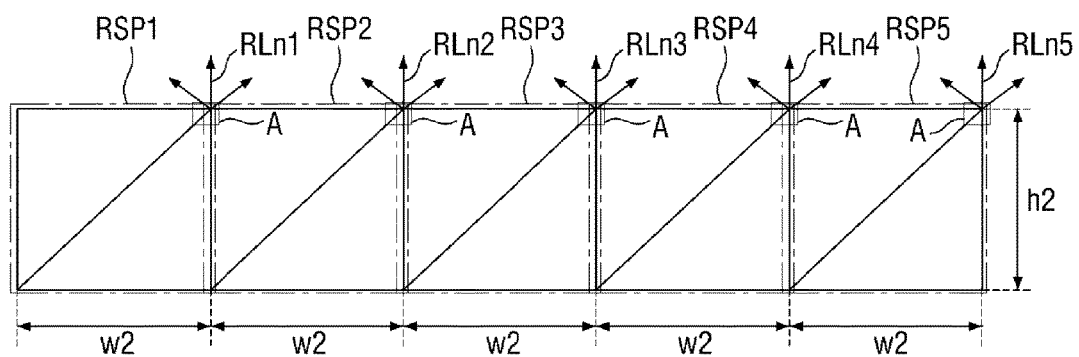

FIGS. 4A and 4B are cross-sectional views for explaining the scattering noises generated in the edges of the split patterns shown in FIG. 2. Here, FIG. 4A shows the sectional shapes of the first to third split patterns SP1 to SP3 shown in FIG. 2. FIG. 4B shows the sectional shapes of first to fifth reference split patterns RSP1 to RSP5.

Referring to FIG. 4A, the sum of the widths w1 of (or the total width) of the first to third split patterns SP1 to SP3 on the section may be expressed by 3×w1. Referring to FIG. 4B, the sum of the widths w2 (or the total width) of the first to fifth reference split patterns RSP1 to RSP5 on the section may be expressed by 5×w2. Here, it is assumed that the sum (3×w1) of the widths w1 of the first to third split patterns SP1 to SP3 on the section is equal to the sum (5×w2) of the widths w2 of the first to fifth reference split patterns RSP1 to RSP5 on the section. Accordingly, based on the same width, the number of the split patterns in FIG. 4B is greater than the number of the split patterns in FIG. 4A.

As described above, the width of the split pattern (w1 or w2) on the section is substantially the same as the thickness (h1 or h2) of the split pattern on the section. Therefore, the first to fifth reference split patterns RSP1 to RSP5 shown in FIG. 4B are relatively thin compared to the first to third split patterns SP1 to SP3 shown in FIG. 4A. This means that the thickness of the backlight unit including the first to fifth reference split patterns RSP1 to RSP5 is thinner than the thickness of the backlight unit 200 including the first to third split patterns SP1 to SP3.

However, referring to FIG. 4A, the first to third split patterns SP1 to SP3 may generate scattered noises Ln1 to Ln3 at respective edges A thereof. Similarly, referring to FIG. 4B, the first to fifth reference split patterns RSP1 to RSP5 may generate scattered noises RLn1 to RLn5 at their respective edges A. The scattered noises cause deterioration in the uniformity of light emitted from the backlight unit 200 and the light efficiency thereof. From the viewpoints of light uniformity and light efficiency, the case of FIG. 4A is superior to the case of FIG. 4B.

This means that the generation of scattered noises and the thinning of the backlight unit 200 are in a trade-off relationship with each other. Accordingly, in an embodiment of the invention, the display device 10 may be configured in a way such that the width w1 and thickness h1 of each of the first to third split patterns SP1 to SP3 on the section are set to have a value in a range of about 1 mm to about 3 mm, in consideration of both the thickness of the backlight unit and the generation of the scattered noises. In such an embodiment, the generation of scattered noises is substantially minimized, and the backlight unit 200 is allowed to be substantially thin, e.g., to have a thickness of about 5 mm or less.

Figure 6:
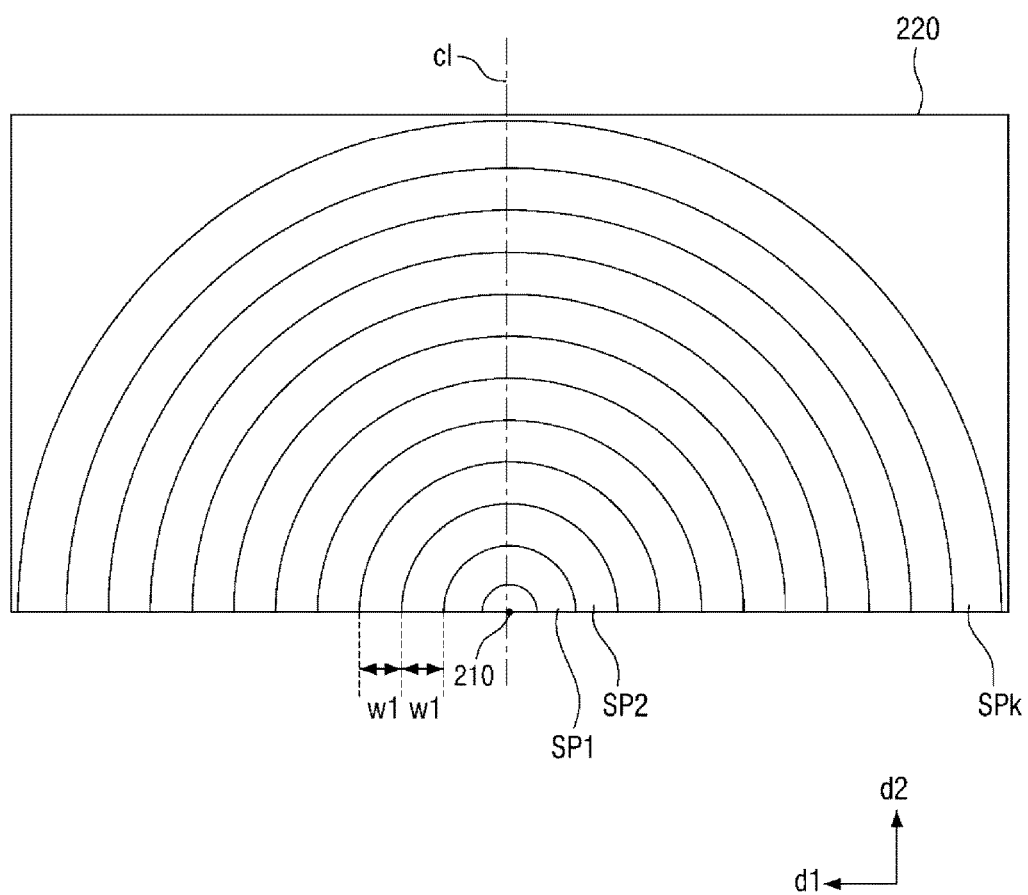
FIG. 6 is a plan view showing the first to k-th split patterns shown in FIG. 2, viewed in a thickness direction of the light guide plate.

FIG. 5 is a perspective view showing the first to k-th split patterns shown in FIG. 2. FIG. 6 is a plan view showing the first to k-th split patterns shown in FIG. 2, viewed in a thickness direction of the light guide plate. However, in the case of FIG. 5, the flat portion SP3c is omitted to clearly show the shape of the light splitting portion SP3a.

Referring to FIGS. 5 and 6, the imaginary center line cl extending along the second direction d2 is defined to overlap the light source portion 210. In an embodiment, the first to k-th split patterns SP1 to SPk may be concentrically arranged around the light source 211. In such an embodiment, the concentric circles defined by the first to k-th split patterns SP1 to SPk may all have a same center. Here, the light source unit 210 may be disposed at, or superimposed on, the center of the concentric circles defined by the first to k-th split patterns SP1 to SPk.

In such an embodiment, as described above, the first to k-th split patterns SP1 to SPk extend along the arcs of the concentric circles, and the arcs of the concentric circles gradually increase from the light source 211 along the second direction d2. In an embodiment, the widths w1 of the first to k-th split patterns SP1 to SPk may be all the same as each other.

In an embodiment, the light emitted from the light source unit 210 having a point light source proceeds in a radial direction along the arrangement form of the first to k-th split patterns SP1 to SPk. In such an embodiment, a part of the light may be reflected in a vertical direction by the light splitting portion SP3a to be provided to the display panel 100, and the remaining part of the light may pass through the light splitting portion SP3a.

According to an embodiment of the invention, the display device 10 may convert a point light source into a surface light source in a state in which the coherence of the light is maintained. In such an embodiment, the light emitted from the light source unit 210 having a point light source is provided to the light guide plate 220 having the first to k-th split patterns SP1 to SPk, so that the point light source may be converted into a surface light source instantly, and the light may be provided to the display panel.

According to an embodiment of the invention, the display device may convert a point light source into a surface light source instantly without using a separate holographic optical element ("HOE") or a diffractive optical element. In such an embodiment, since the backlight unit 200 includes the light guide plate 220 provided with the first to k-th split patterns SP1 to SPk without using a separate HOE or a diffractive optical element, the thickness of the backlight unit 200 may be substantially reduced.

In such an embodiment, the light emitted from the light source unit 210 having a point light source proceeds in a radial direction according to the arrangement form of the first to k-th split patterns SP1 to SPk, so that a point light source may be converted into a surface light source in a state in which the coherence of light is maintained.

In an embodiment, the number of the first to k-th split patterns SP1 to SPk shown in FIGS. 2, 5 and 6, the diameter of the concentric circle and the like are not limited to those shown in the drawings. In such an embodiment, as long as the light emitted from the light source unit 210 having the point light source proceeds in the centrifugal direction so that the point light source is effectively converted to the surface light source, the positions where the light source unit 210 is disposed are not limited to a particular position or those shown in FIGS. 5 and 6.

Hereinafter, an alternative embodiment of the light guide plate 220 will be described with reference to FIGS. 7 to 16. In FIGS. 7 to 16, reference numerals 220a to 220f will be used to indicate alternative embodiments of the light guide plate. Any repetitive detailed description of same or like elements described above with reference to FIGS. 1 to 5 will hereinafter be omitted. FIGS. 7, 8, 10, 11, 12 and 14 are plan views showing alternative embodiments of the light guide plate viewed in a thickness direction of the light guide plate.

Figure 7:
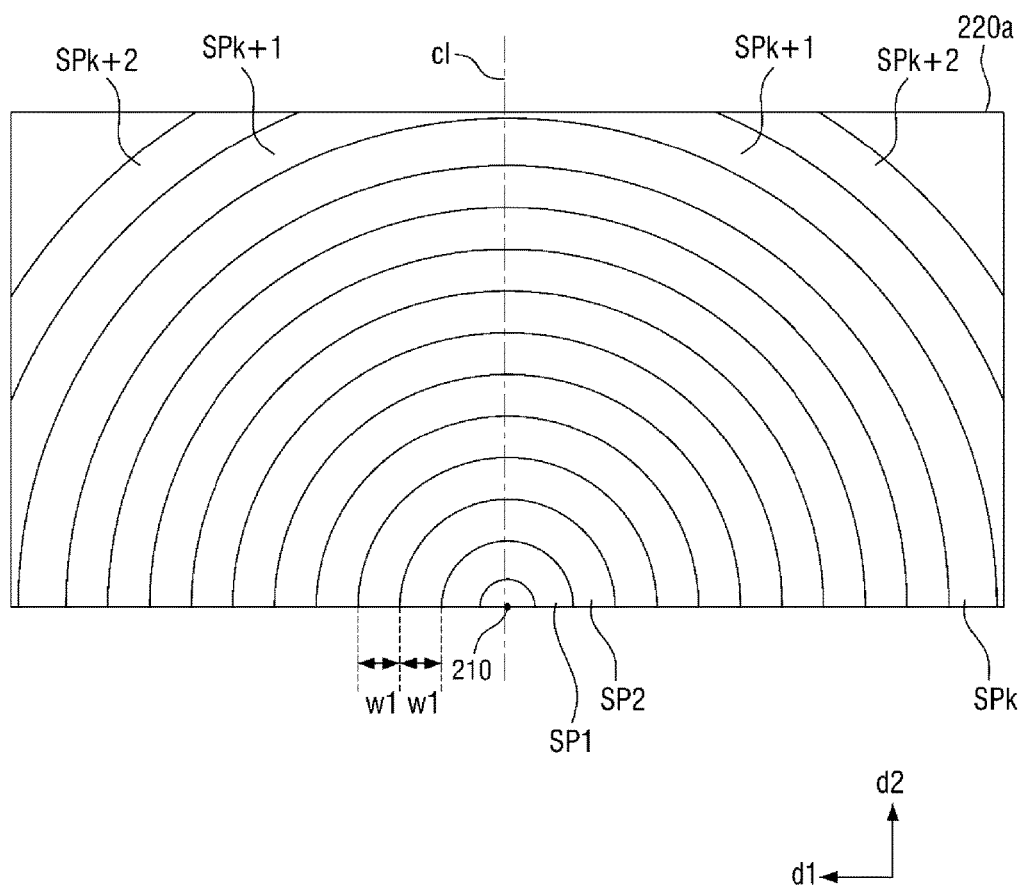
FIG. 7 is a plan view showing an alternative embodiment of the first to k-th split patterns shown in FIG. 2, viewed in a thickness direction of the light guide plate.

FIG. 7 is a plan view showing an alternative embodiment of the first to k-th split patterns shown in FIG. 2, viewed in a thickness direction of the light guide plate.

Referring to FIG. 7, in an embodiment, a light guide plate 220a may further include a (k+1)-th split pattern SPk+1 and a (k+2)-th split pattern SPk+2.

The arrangement relationship of the (k+1)-th split pattern SPk+1 and the (k+2)-th split pattern SPk+2 will hereinafter be described in detail. In such an embodiment, the light guide plate 220a includes one lateral side disposed at a position extending along the first direction d1 and the other lateral side disposed opposite thereto. As described above, such lateral sides are defined as one lateral side and the other lateral side in the length direction of the light guide plate 220a.

In such an embodiment, the light guide plate 220a includes one lateral side disposed at a position extending along the second direction d2 and the other lateral side disposed opposite thereto. As described above, such lateral sides are defined as one lateral side and the other lateral side in the width direction of the light guide plate 220a.

In an embodiment, as shown in FIG. 7, the first to k-th split patterns SP1 to SPk may be in contact with the other lateral side of the light guide plate 220a in the width direction, but may not be in contact with the one lateral side and the other lateral side of the light guide plate 220a in the length direction. In such an embodiment, the k-th and (k+1)-th split patterns SPk and SPk+1 may be in contact with the one lateral side and the other lateral side of the light guide plate 220a in the length direction. In such an embodiment, when the concentric circles are drawn along the k-th and (k+1)-th split patterns SPk and SPk+1, the diameter of each of the concentric circles is greater than the length of the light guide plate 220a.

In such an embodiment, the light guide plate 220a includes a (k+1)-th split pattern SPk+1 adjacent the k-th split pattern and a (k+2)-th split pattern SPk+2 adjacent to the (k+1) split pattern SPk+1 in addition to the first to k-th split patterns SP1 to SPk. Accordingly, the uniformity of light emitted to the display panel 100 along the vertical direction in the entire light guide plate 220a may be improved.

In such an embodiment, as shown in FIG. 7, the k-th and k+1-th split patterns SPk and SPk+1 are additionally disposed on the light guide plate 220a. However, the invention is not limited thereto. In such an embodiment, the number of additional split patterns may be variously modified depending on the uniformity of light emitted from the light guide plate 220a, the shape of the display panel 100, the shape of the light guide plate 220a, and the like.

Figure 8:
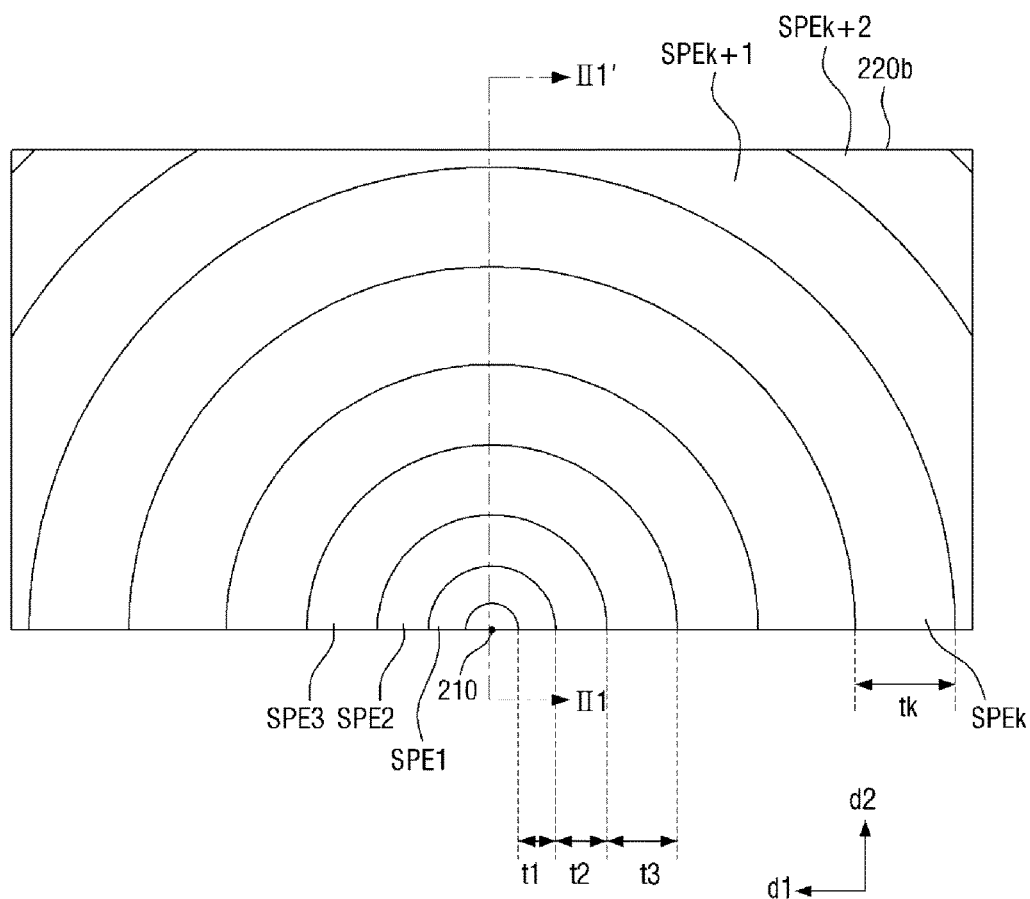
FIG. 8 is a plan view showing another alternative embodiment of the first to k-th split patterns shown in FIG. 2, viewed in a thickness direction of the light guide plate.
Figure 9:
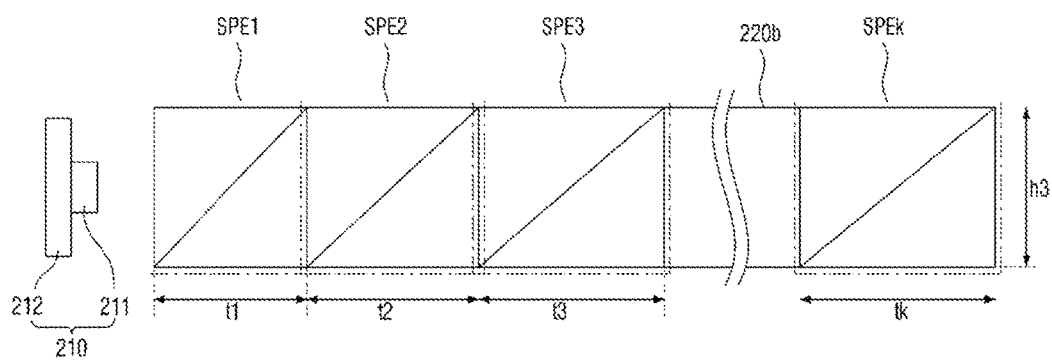
FIG. 9 is a sectional view taken along line II1-II1' of FIG. 8.

FIG. 8 is a plan view showing another alternative embodiment of the first to k-th split patterns shown in FIG. 2, viewed in a thickness direction of the light guide plate. FIG. 9 is a sectional view taken along line II1-II1' of FIG. 8.

Referring to FIGS. 8 and 9, first to k-th split patterns SPE1 to SPEk may be on a light guide plate 220b.

The first to k-th split patterns SPE1 to SPEk may be concentrically arranged around the light source 211 in a plane. In such an embodiment, the concentric circles formed by the first to k-th split patterns SPE1 to SPEk may all have a same center. In such an embodiment, the light source unit 210 may be superimposed on or disposed at the center.

In an embodiment, as shown in FIG. 8, the widths w1 of the first to k-th split patterns SPE1 to SPEk on the section may be different one from another. The first to third split patterns SPE1 to SPE3 in one embodiment will be described.

In an embodiment, as shown in FIG. 8, the first split pattern SPE1 may have a first width t1 on the section, the second split pattern SPE2 may have a second width t2 on the section, and the third split pattern SPE3 may have a third width t3 on the section. In such an embodiment, the first to third widths (t1 to t3) may be different from each other. In an embodiment, the second width t2 may be greater than the first width t1, and the third width t3 may be greater than the second width t2. In such an embodiment, the larger the sizes of the concentric circles, the larger the widths of the first to k-th split patterns SPE1 to SPEk on the section. Therefore, the k-th width tk of the k-th split pattern SPEk may be greater than the width of each of the first to k−1-th split patterns SPE1 to SPEk−1 on the section. In such an embodiment, as shown in FIG. 9, at least one of the widths of the split patterns (e.g., t1 to t3) on the section may be different from the thickness h3 of the split pattern on a section.

In such an embodiment, the widths of the first to k-th split patterns SPE1 to SPEk on the section may not be all different from each other, and the widths of at least two split patterns on the section may be the same as each other.

In such an embodiment, (k+1)-th and (k+2)-th split patterns SPEk+1 and SPEk+2 may be additionally disposed on the light guide plate 220b. Accordingly, the uniformity of light emitted to the display panel 100 along the vertical direction in the entire light guide plate 220b may be improved.

Figure 10:
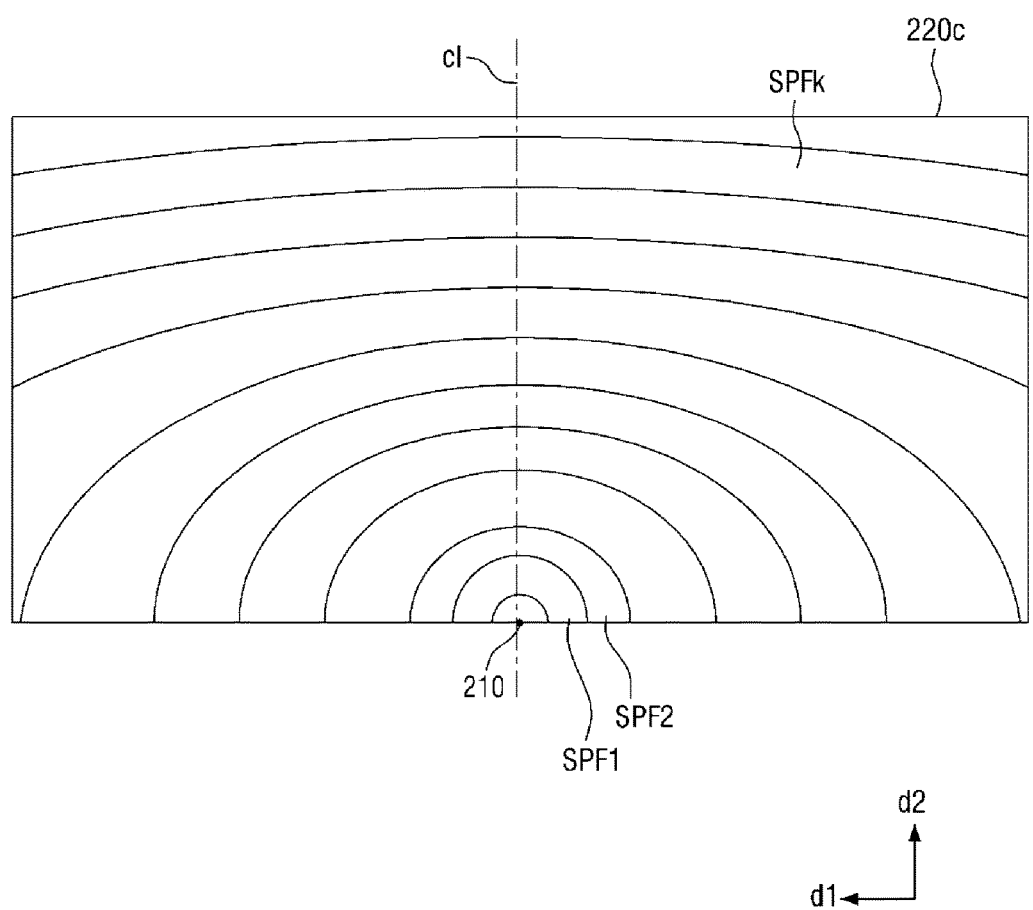
FIGS. 10 to 12 are plan views showing other alternative embodiments of the first to k-th split patterns shown in FIG. 2, viewed in a thickness direction of the light guide plate.
Figure 11:
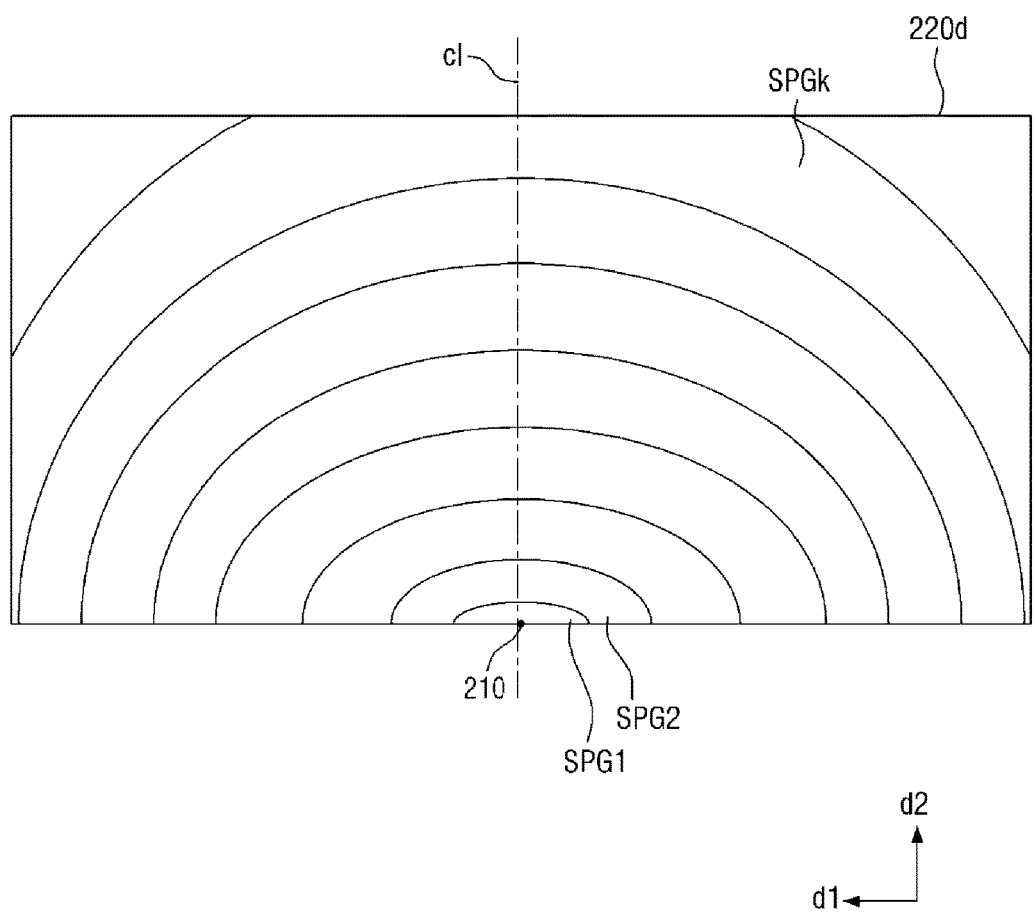
Figure 12:
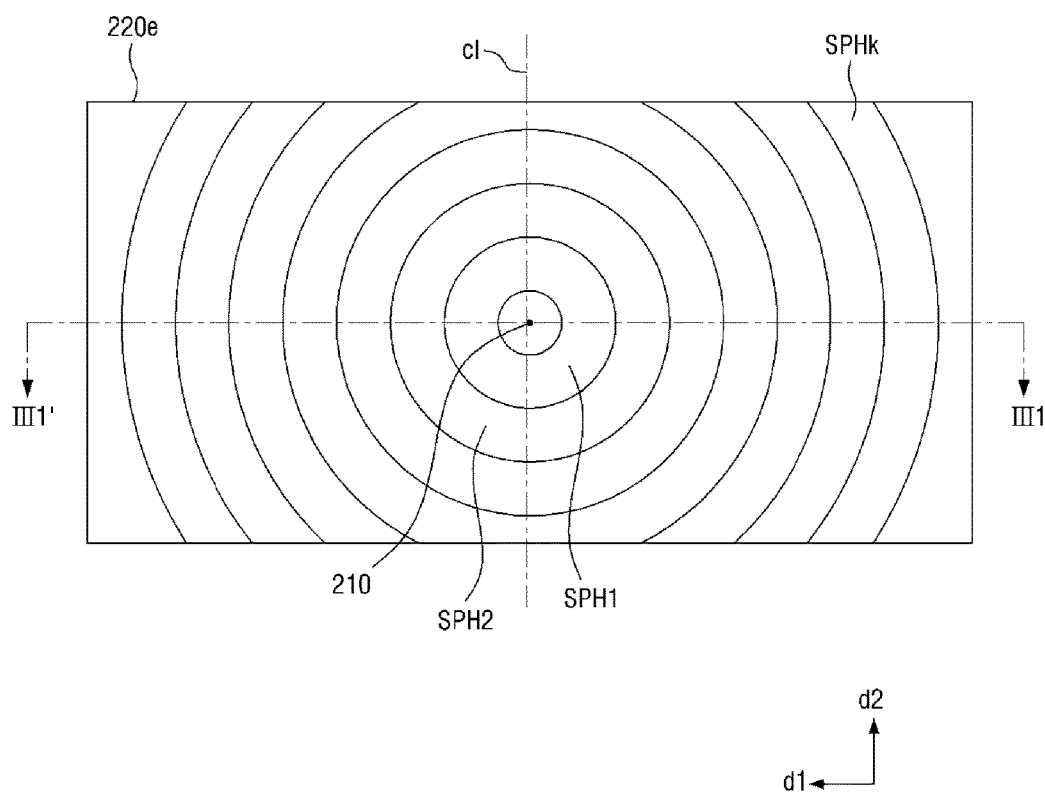

FIGS. 10 to 12 are plan views showing other alternative embodiments of the first to k-th split patterns shown in FIG. 2, in a thickness direction of the light guide plate.

Referring to FIG. 10, in an embodiment, first to k-th split patterns SPF1 to SPFk may be disposed on a light guide plate 220c. The widths of the first to k-th split patterns SPF1 to SPFk on the section may become larger as being away from the light source portion 210, and the widths of the respective split patterns on the section may be different from each other. In such an embodiment, the first to k-th split patterns SPF1 to SPFk may not form concentric circles.

Referring to FIG. 11, in an alternative embodiment, first to k-th split patterns SPG1 to SPGk may be on a light guide plate 220d. The widths of the first to k-th split patterns SPG1 to SPGk on the section may become smaller as being away from the light source portion 210, and the widths of the respective split patterns on the section may be different from each other. In such an embodiment, the first to k-th split patterns SPG1 to SPGk may not form concentric circles.

Figure 13:
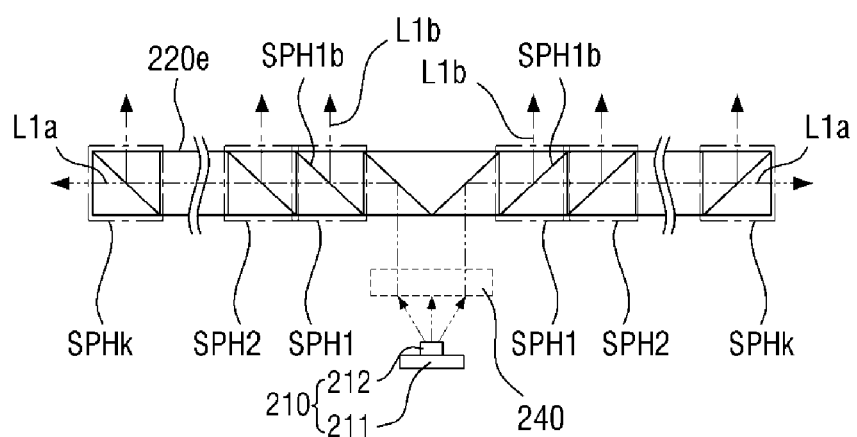
FIG. 13 is a sectional view taken along line III1-III1' of FIG. 12.

FIG. 13 is a sectional view taken along line III1-III1' of FIG. 12.

Referring to FIGS. 12 and 13, in another alternative embodiment, first to k-th split patterns SPH1 to SPHk may be disposed on a light guide plate 220e. The first to k-th split patterns SPH1 to SPHk may be concentrically arranged around the light source 211. In such an embodiment, the light source unit 210 may be disposed at the center of the light guide plate 220e.

In such an embodiment, the light source unit 210, which has a point light source, is disposed to overlap the center of the first to k-th split patterns SPH1 to SPHk, and the center may be located at the center of the light guide plate 220e.

Hereinafter, the path of light emitted from the light source unit 210 in such an embodiment will be described in greater detail.

In such an embodiment, as shown in FIG. 13, the backlight unit further includes a light diffusion unit 240. The light source unit 210 is located at the center of the light guide plate 220e, and may emit light in all directions. The light emitted from the light source unit 210 may be provided to the light diffusion unit 240. The light diffusion unit 240 is disposed under the light guide plate 220e, and, more particularly, may be disposed between the light source unit 210 and the light guide plate 220e.

The light diffusion unit 240 may collect the light emitted from the light source unit 210 and provide the collected light to the light guide plate 220e. The kind of the light diffusion unit 240 is not particularly limited as long as the light diffusion unit 240 collects the light emitted from the light source unit 210 and provides the collected light to the light guide plate 220e.

The first to k-th split patterns SPH1 to SPHk may change the path of light provided from the light source 211 and provide the light to the display panel 100. Hereinafter, for convenience of description, the first split pattern SPH1 will be described in detail as reference. In such an embodiment, the first split pattern SPH1 reflects a part of the light provided to the incident surface SPH1b to generate reflected light L1b, and transmits the remaining part of the light to generate transmitted light L1a. In such an embodiment, the reflected light L1b may be emitted to the display panel 100 in a direction substantially perpendicular the light provided to the incident surface SPH1b and may be provided to the display panel 100. In such an embodiment, the transmitted light L1a may pass through the incident surface SPH1b and proceed in a radial direction. Accordingly, the light emitted from the light source unit 210 is converted into a surface light source in a state in which coherence is maintained. In such an embodiment, the thickness and width of each of the first to k-th split patterns SPH1 to SPHk on the section may be about 1 mm or less.

Figure 14:
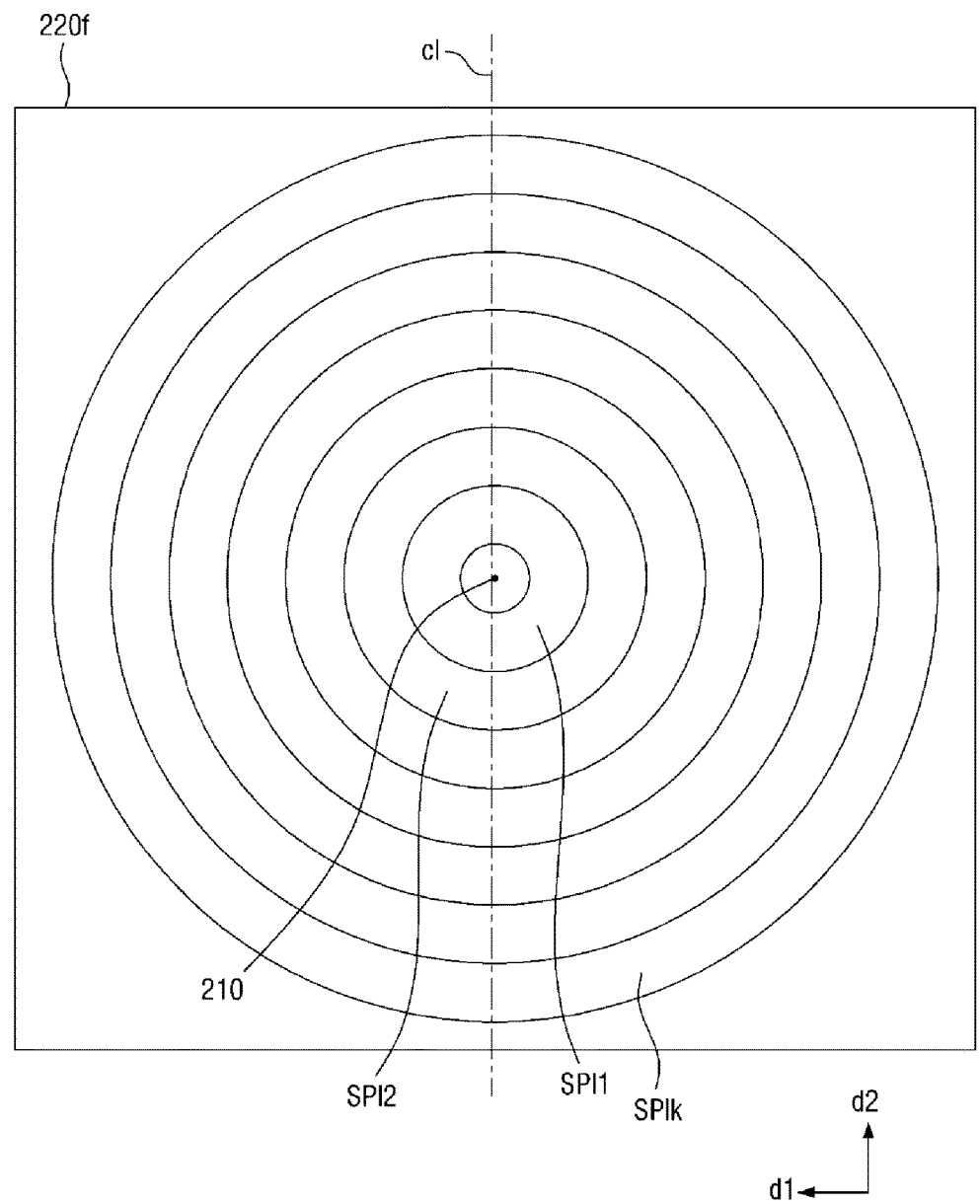
FIG. 14 is a plan view showing still another alternative embodiment of the first to k-th split patterns shown in FIG. 2, viewed in a thickness direction of the light guide plate.

FIG. 14 is a plan view showing still another alternative embodiment of the first to k-th split patterns shown in FIG. 2, viewed in a thickness direction of the light guide plate.

Referring to FIG. 14, in an embodiment, first to k-th split patterns SPI1 to SPIk are arranged on a light guide plate 220f, and each of the first to k-th split patterns SPI1 to SPIk may have an entire circular shape on the light guide plate 220f. Although it is shown in FIG. 14 that the size of the light guide plate 220f is enlarged, the widths of the first to k-th split patterns SPI1 to SPIk on the section may be reduced while the size of the light guide plate 220f is reduced to the size of the light guide plate 220 show in FIG. 1.

Figure 15A:
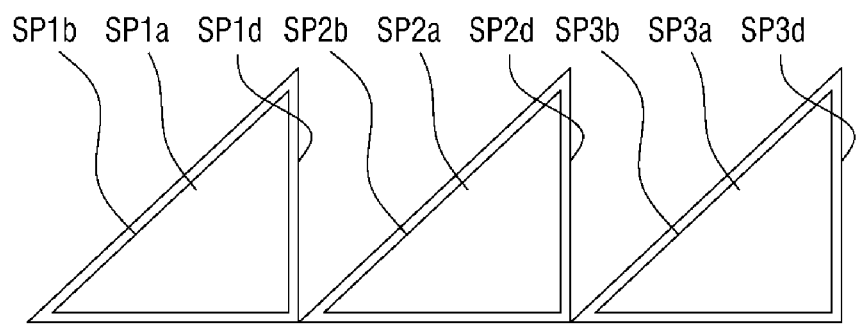
FIGS. 15A, 15B, 16A and 16B are sectional views showing other alternative embodiments of the first to third split patterns shown in FIG. 2, viewed in a thickness direction of the light guide plate.
Figure 15B:
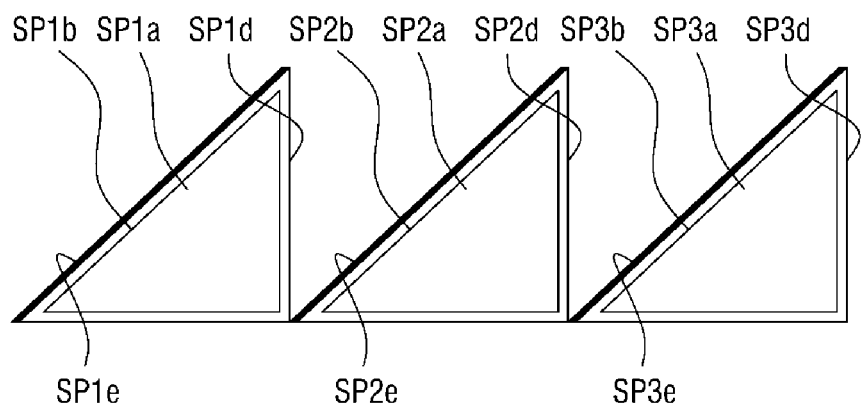

FIGS. 15A, 15B, 16A and 16B are sectional views showing other alternative embodiments of the first to third split patterns shown in FIG. 2, viewed in a thickness direction of the light guide plate. Hereinafter, the first to third split patterns in FIGS. 15A, 15B, 16A and 16B will be described in detail as a reference. In such an embodiment, the configuration of the first to third split patterns are substantially the same as those of the remaining split patterns, and any repetitive detailed descriptions thereof will be omitted. In such an embodiment, the same or like elements shown in FIGS. 15A, 15B, 16A and 16B have been labeled with the same reference characters as used above to describe embodiments of the first to third split patterns shown in FIG. 2. In FIGS. 15A and 15B, for convenience of illustration, the flat portions SP1c to SP3c are not shown.

Referring to FIG. 15A, the first to third split patterns SP1 through SP3 may further include coating layers SP1d, SP2d, and SP3d, respectively. The coating layers SP1d, SP2d, and SP3d may be disposed to surround the first to third light splitting portions SP1a to SP3a, respectively.

In an embodiment, the coating layers SP1d, SP2d, and SP3d may include a metal material. In such an embodiment, the metal material may include aluminum (Al), silver (Ag), or gold (Au), for example. In such an embodiment, the coating layers SP1d, SP2d and SP3d are disposed on the first to third light splitting portions SP1a to SP3a, thereby adjusting the transmission and reflection ratios of the first to third split patterns SP1 to SP3. Thus, in such an embodiment, the uniformity of light incident on the display panel 100 from the light guide plate 220 may be effectively controlled.

In an embodiment, as shown in FIG. 15A, the thicknesses of the coating layers SP1d, SP2d, and SP3d are all the same as each other, but the invention is not limited thereto. In an alternative embodiment, the thicknesses of the coating layers SP1d, SP2d, and SP3d are different for each of the first to third light splitting portions SP1a to SP3a, thereby controlling the uniformity of the light incident on the display panel 100 from the light guide plate 220.

Referring to FIG. 15B, the first to third split patterns SP1 to SP3 may further include coating layers SP1d, SP2d and SP3d, and a neutral density filter SP1e, SP2e and SP3e. In such an embodiment, the thicknesses of the coating layers SP1d, SP2d and SP3d may all be the same as each other. In such an embodiment, the coating layers SP1d, SP2d, and SP3d having the same thickness are collectively formed, and a neutral density filter SP1e, SP2e or SP3e is further provided on each of the first to third split patterns SP1 to SP3, thereby improving the uniformity of the light incident on the display panel 100 from the light guide plate 220.

Figure 16A:
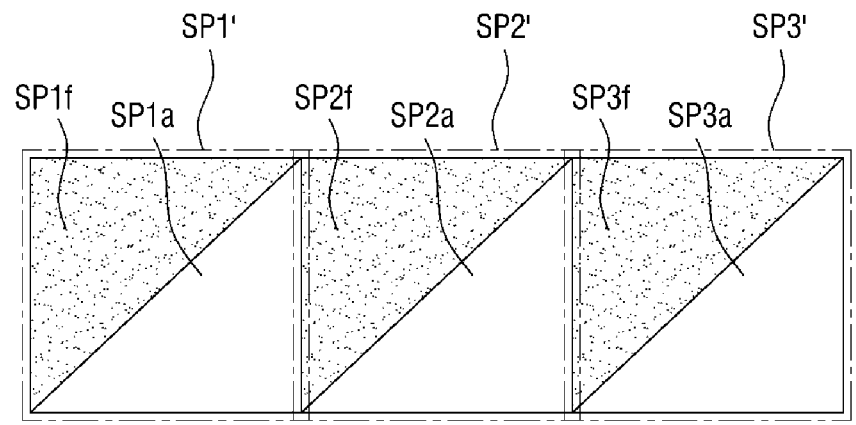

Referring to FIG. 16A, in another alternative embodiment, the materials of the flat portions SP1f to SP3f of the first to third split patterns SP1" to SP3" and the materials of the light split portions SP1a to SP3a thereof may be different from each other. In such an embodiment, the flat portions SP1f to SP3f and the light splitting portions SP1a to SP3a may be formed through different processes from each other.

In one embodiment, for example, after the light splitting portions SP1a to SP3a are formed first, the flat portions SP1f to SP3f may be formed in such a manner as to fill gaps between the light splitting portions SP1a to SP3a.

In such an embodiment, even if the flat portions SP1f to SP3f and the light splitting portions SP1a to SP3a are formed through different processes or different materials, the refractive indexes of the flat portions SP1f to SP3f and the light splitting portions SP1a to SP3a are substantially the same as each other.

Figure 16B:
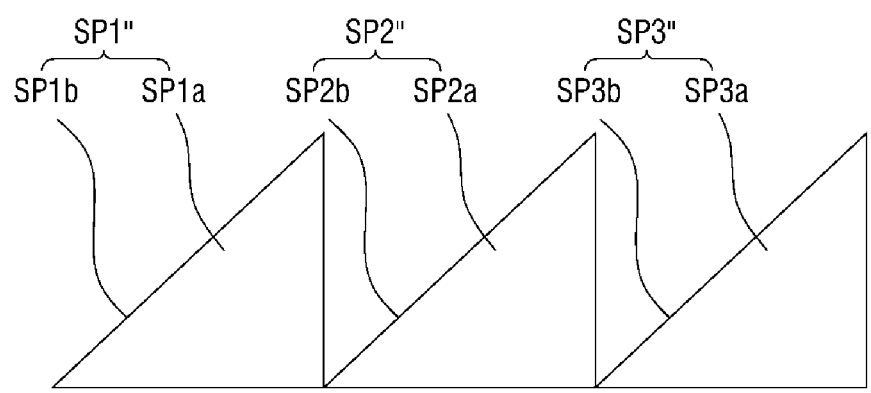

Referring to FIG. 16B, in another alternative embodiment, the first to third split patterns SP1' to SP3' include light splitting portions SP1a to SP3a and incident surfaces SP1b to SP3b, but may not include the flat portions SP1c to SP3c shown in FIG. 3. In such an embodiment, the light guide plate 220 may further include a separate structure, for example, a refraction matching layer or the like, to ensure flatness.

As described above, according to embodiments of the invention, a point light source is effectively converted into a surface light source.

In such embodiments, a surface light source is generated in a state in which the coherence of light is maintained.

In such embodiments, the thickness of the backlight unit is effectively reduced, and the light efficiency thereof is substantially improved.

The invention should not be construed as being limited to the exemplary embodiments set forth herein. Rather, these exemplary embodiments are provided so that this disclosure will be thorough and complete and will fully convey the concept of the invention to those skilled in the art.

While the invention has been particularly shown and described with reference to exemplary embodiments thereof, it will be understood by those of ordinary skill in the art that various changes in form and details may be made therein without departing from the spirit or scope of the invention as defined by the following claims.

What is claimed is:

1. A backlight unit, comprising:
a light source unit including a point light source;
a light guide plate including a coating layer and disposed on a path of light emitted from the light source unit, wherein a plurality of split patterns is defined in the light guide plate,
wherein
the plurality of split patterns transmits a part of the light emitted from the light source unit and reflects a remaining part thereof, and
the plurality of split patterns is concentrically arranged on the light guide plate and around the light source unit,
the coating layer is disposed to surround a light splitting portion, and
each of the plurality of split patterns include the light splitting portion having an incident surface on which the light emitted from the light source unit is incident.

2. The backlight unit of claim 1, wherein
the light splitting portion has a triangular shape.

3. The backlight unit of claim 2, wherein
each of the plurality of split patterns further includes a flat portion symmetric with the light splitting portion.

4. The backlight unit of claim 1, wherein
the light guide plate includes one lateral side in a length direction and the other lateral side in the length direction, and
the light source unit is disposed at a center of the light guide plate in the length direction.

5. The backlight unit of claim 1, wherein
the light source unit provides light to a center of the light guide plate.

6. The backlight unit of claim 1, wherein
widths of at least two of the plurality of split patterns on a section are the same as each other.

7. The backlight unit of claim 1, wherein
thicknesses of at least two of the plurality of split patterns on a section are the same as each other.

8. The backlight unit of claim 1, further comprising:
a light diffusion unit disposed between the light source unit and the light guide plate.

9. The backlight unit of claim 1, wherein
the point light source includes a light emitting diode.

10. A display device, comprising:
a display panel;
a backlight unit which provides light to the display panel;
wherein the backlight unit includes:
a light source unit; and
a light guide plate including a coating layer and disposed on a path of light emitted from the light source unit, and
the light guide plate includes a plurality of split patterns which transmits a part of the light emitted from the light source unit and reflects a remaining part thereof,
the plurality of split patterns is concentrically arranged on the light guide plate and around the light source unit,
the coating layer is disposed to surround a light splitting portion, and
each of the plurality of split patterns include the light splitting portion having an incident surface on which the light emitted from the light source unit is incident.

11. The display device of claim 10, wherein
the light splitting portion protrudes toward the display panel.

12. The display device of claim 11, wherein
the light splitting portion has a triangular shape.

13. The display device of claim 11, wherein
the light splitting portion includes the incident surface and a bottom surface contacting the incident surface, and
an angle between the incident surface and the bottom surface is about 45°.

14. The display device of claim 11, wherein
a width of the light splitting portion on a section is in a range of about 3 millimeters to about 5 millimeters.

15. The display device of claim 11, wherein
each of the plurality of split patterns further includes a flat portion symmetric with the light splitting portion.

16. The display device of claim 15, wherein
the light splitting portion and the flat portion comprise different materials from each other.

17. The display device of claim 10, wherein
the light source unit includes a point light source, and
the light provided to the display panel is a surface light source.

18. The display device of claim 10, wherein
widths and thicknesses of the plurality of split patterns on a section are all the same as each other.

19. The display device of claim 10, wherein the light source unit includes a light emitting diode.

20. The display device of claim 10, wherein
the light source unit is disposed under the light guide plate, and
the light source unit provides the light to a center of the light guide plate.

* * * * *